(12) United States Patent
Yang

(10) Patent No.: US 9,143,066 B2
(45) Date of Patent: Sep. 22, 2015

(54) PERMANENT MAGNET MOTOR WITH SINUSOIDAL BACK-EMF WAVEFORM AND RELATED MOTOR CONTROLLER FOR POSITION SENSORLESS DRIVES

(71) Applicant: Texas Instruments Incorporated, Dallas, TX (US)

(72) Inventor: Shih-Chin Yang, Richardson, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 86 days.

(21) Appl. No.: 13/761,041

(22) Filed: Feb. 6, 2013

(65) Prior Publication Data

US 2014/0217944 A1 Aug. 7, 2014

(51) Int. Cl.
*H02K 29/06* (2006.01)
*H02P 6/18* (2006.01)

(52) U.S. Cl.
CPC . *H02P 6/18* (2013.01); *H02P 6/182* (2013.01)

(58) Field of Classification Search
USPC ............... 318/400.32, 400.15, 721, 400.02, 318/400.01, 400.06
See application file for complete search history.

(56) References Cited

U.S. PATENT DOCUMENTS

| 2007/0257626 | A1* | 11/2007 | Lee et al. ................. 318/268 |
| 2010/0237817 | A1* | 9/2010 | Liu et al. ............... 318/400.34 |
| 2010/0289370 | A1 | 11/2010 | Roth et al. |
| 2011/0210810 | A1* | 9/2011 | Miyata et al. ............. 335/302 |
| 2012/0038237 | A1* | 2/2012 | Li et al. ............... 310/156.45 |
| 2012/0062160 | A1 | 3/2012 | Yang et al. |
| 2012/0130153 | A1* | 5/2012 | Bolyard et al. ............. 600/17 |
| 2013/0231891 | A1* | 9/2013 | Long et al. ............... 702/145 |

OTHER PUBLICATIONS

Marco Tursini, Speed and Position estimation for PM Synchronous motor with BAck-EMF observer, Industry applications Conference, 2005, pp. 2083-2090.*
Nobuyuki Matsui, "Sensorless PM Brushless DC Motor Drives", IEEE Transactions on Industrial Electronics, vol. 43, No. 2, Apr. 1996, pp. 300-308.
Jung-Ik Ha et al., "Design and Selection of AC Machines for Saliency-Based Sensorless Control", 2002 IEEE, pp. 1155-1162.

(Continued)

*Primary Examiner* — Rina Duda
*Assistant Examiner* — Bickey Dhakal
(74) *Attorney, Agent, or Firm* — Tuenlap D. Chan; Frank D. Cimino

(57) ABSTRACT

A system includes a permanent magnet motor having a rotor and a stator. The rotor and the stator have a configuration that causes the motor to generate a back-electromagnetic force (EMF) waveform that is substantially sinusoidal. The system also includes a motor controller having a sliding-mode observer configured to identify the back-EMF waveform and a position observer configured to estimate at least one characteristic of the motor using the identified back-EMF waveform. The stator may include multiple teeth projecting towards the rotor and multiple conductive windings, where each conductive winding is wound around a single tooth. The rotor may include multiple magnetic poles, where each magnetic pole has a span of about 60° or less. The sliding-mode observer may be configured to receive current measurements associated with three-phase signals and voltage commands generated by the motor controller. The position observer may include a proportional-integral (PI) regulator.

13 Claims, 7 Drawing Sheets

(56) References Cited

OTHER PUBLICATIONS

Ji-Hoon Jang et al, "Sensorless Drive of Surface-Mounted Permanent-Magnet Motor by High-Frequency Signal Injection Based on Magnetic Saliency", IEEE Transactions on Industry Application, vol. 39, No. 4, Jul./Aug. 2003, pp. 1031-1039.

Dahaman Ishak et al, "Permanent-Magnet Brushless Machines With Unequal Tooth Widths and Similar Slot and Pole Numbers", IEEE Transactions on Industry Applications, vol. 41, No. 2, Mar./Apr. 2005, pp. 584-590.

Kan Akatsu et al, "SPMSM Design Considerations for Initial Position and Magnet Polarity Estimation Using Carrier Signal Injection", 2007 IEEE, pp. 2393-2398.

Song Chi et al, "Sliding-Mode Sensorless Control of Direct-Drive PM Synchronous Motors for Washing Machine Applications", IEEE Transactions on Industry Applications, vol. 45, No. 2, Mar./Apr. 2009, pp. 582-590.

\* cited by examiner

PERMANENT MAGNET MOTOR WITH SINUSOIDAL BACK-EMF WAVEFORM AND RELATED MOTOR CONTROLLER FOR POSITION SENSORLESS DRIVES

TECHNICAL FIELD

This disclosure is generally directed to motors and motor controllers. More specifically, this disclosure is directed to a permanent magnet motor with a sinusoidal back-electromagnetic force (EMF) waveform and a related motor controller for position sensorless drives.

BACKGROUND

A permanent magnet motor represents a type of motor where a fixed stator causes rotation of a movable rotor. The rotor typically includes multiple magnets embedded in or connected to the rotor, and the stator typically includes multiple conductive windings. Electrical signals through the windings generate a rotating magnetic field that interacts with the magnets of the rotor, causing the rotor to rotate.

"Sensorless" motor control refers to an approach where one or more characteristics of a motor, such as motor speed or rotor position, are mathematically derived. Sensorless motor control typically avoids the use of separate speed and position sensors that are mechanically attached to a motor, which might otherwise detrimentally affect the performance of the motor (such as by affecting the maximum torque output per volume and drive system reliability).

SUMMARY

This disclosure provides a permanent magnet motor with a sinusoidal back-electromagnetic force (EMF) waveform and a related motor controller for position sensorless drives.

In a first example, a system includes a permanent magnet motor having a rotor and a stator. The rotor and the stator have a configuration that causes the motor to generate a back-electromagnetic force (EMF) waveform that is substantially sinusoidal. The system also includes a motor controller having a sliding-mode observer configured to identify the back-EMF waveform and a position observer configured to estimate at least one characteristic of the motor using the identified back-EMF waveform.

In a second example, an apparatus includes a permanent magnet motor having a rotor and a stator. The rotor includes multiple magnetic poles, and the stator includes multiple teeth projecting towards the rotor and multiple conductive windings. The rotor and the stator are configured so that the permanent magnet motor generates a back-electromagnetic force (EMF) waveform that is substantially sinusoidal.

In a third example, an apparatus includes a motor controller configured to generate signals for controlling operation of a permanent magnet motor. The motor controller includes a sliding-mode observer and a position observer. The sliding-mode observer is configured to identify a back-electromagnetic force (EMF) waveform associated with the permanent magnet motor. The position observer is configured to estimate at least one characteristic of the permanent magnet motor using the identified back-EMF waveform.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 11, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
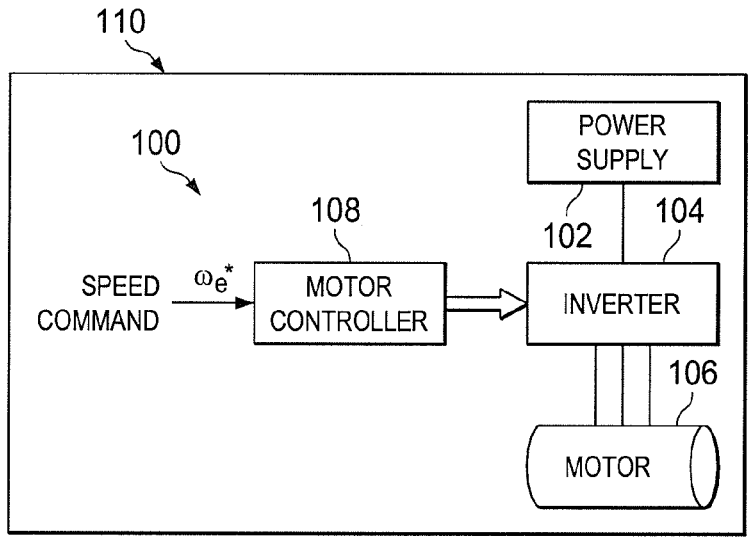
FIG. 1 illustrates an example system with a permanent magnet motor in accordance with this disclosure.

FIG. 1 illustrates an example system 100 with a permanent magnet motor in accordance with this disclosure. As shown in FIG. 1, the system 100 includes a power supply 102, an inverter 104, and a permanent magnet motor 106. The power supply 102 represents a direct voltage (DC) power source that provides DC power to the inverter 104. The power supply 102 includes any suitable structure for providing DC power, such as one or more batteries, fuel cells, solar cells, or other DC source(s).

The inverter 104 receives the DC power from the power source 102 and converts the DC power into an alternating voltage (AC) form. In this example, the inverter 104 represents a three-phase inverter that converts DC power into three-phase AC powers that are provided to the motor 106. The inverter 104 includes any suitable structure for converting power from DC form to AC form. For example, the inverter 104 could include a number of transistor switches driven using pulse width modulation (PWM) signals.

The motor 106 represents a permanent magnet motor that operates using the voltages provided by the inverter 104. As described in more detail below, the motor 106 includes a rotor with magnets embedded in or connected to the rotor. The motor 106 also includes a stator with multiple teeth around which conductive windings are wound. The windings are selectively energized and de-energized based on the signals from the inverter 104, which creates a rotating magnetic field that causes the rotor to rotate. Also as described in more detail below, the motor 106 generates a back-electromagnetic force (EMF) waveform that is substantially more sinusoidal in form than conventional permanent magnet motors.

A motor controller 108 controls the operation of the inverter 104 to thereby control the operation of the motor 106. For example, the motor controller 108 could generate PWM signals that drive the transistor switches in the inverter 104. By controlling the duty cycles of the PWM signals, the motor controller 108 can control the three-phase voltages provided by the inverter 104 to the motor 106.

In this example, the motor controller 108 receives as input a commanded speed signal $\omega_e^*$, which identifies a desired speed of the motor 106. The motor controller 108 may also receive as input feedback from one or more observers (such as those implemented within the motor controller 108), where the feedback identifies the estimated motor speed, rotor position, or other characteristic(s) of the motor 106. The motor controller 108 uses the inputs to generate PWM signals for driving the transistor switches in the inverter 104.

As described in more detail below, the motor controller 108 supports the use of sensorless field-oriented control. That is, the motor controller 108 does not receive sensor measurements from sensors mounted in or on the motor 106. Rather, the motor controller 108 infers one or more characteristics of the motor 106, such as motor speed or rotor position. Moreover, the motor controller 108 is designed to operate with the more sinusoidal back-EMF waveform that is generated by the motor 106. To support these functions, the motor controller 108 uses a cascaded observer-based estimation algorithm to identify position and velocity estimates for the motor 106, even in noisy environments.

In general, the performance of conventional sensorless motor drives is often limited at low speeds due to a low signal-to-noise (SNR) ratio of the back-EMF signals generated by the motors. This may not be acceptable in various applications, such as in industrial applications involving the use of electric bikes, robots, or variable-speed compressors. Designing the motor 106 to provide an improved sinusoidal back-EMF waveform and designing an appropriate control algorithm for the motor controller 108 can help to improve the low-speed operation of the motor 106 and provide better sensorless drive performance, even in very noisy environments.

Various benefits can be obtained using this approach, although the particular benefits depend on the specific implementation. For example, the motor controller 108 can achieve improved low-speed sensorless performance with a simpler hardware design. As described below, only two current sensors may be needed in the motor control algorithm, reducing the size and cost of using this approach. Moreover, this approach is compatible with other enhanced algorithms used in field-oriented control designs, such as initial position estimation using high-frequency signal injection (as described in U.S. Pat. No. 5,559,419). Additional details regarding the designs of the motor 106 and the motor controller 108 are provided below.

The components 102-108 here could reside within or otherwise form at least a part of any suitable larger system 110 that uses one or more motors. For example, the larger system 110 could represent a vehicle, electric scooter or bicycle, HVAC (heating, ventilation, and air conditioning) system, pump, actuator, compressor, robot, or optical disc drive of a computing device or home entertainment device. In general, any device or system that uses a motor that can operate (either temporarily or permanently) at a low speed could incorporate the designs of the motor 106 and the motor controller 108 described in this patent document.

Although FIG. 1 illustrates one example of a system 100 with a permanent magnet motor, various changes may be made to FIG. 1. For example, various components in FIG. 1 could be combined or further subdivided. As a particular example, one or more of the components 102, 104, 108 could be incorporated into the motor 106 itself.

FIGS. 2A through 7B illustrate example design details of a permanent magnet motor in accordance with this disclosure. These design details could be incorporated into the permanent magnet motor 106 in the system 100 of FIG. 1. Of course, these design details could be incorporated into other permanent magnet motors operating in other systems.

Figure 2A:
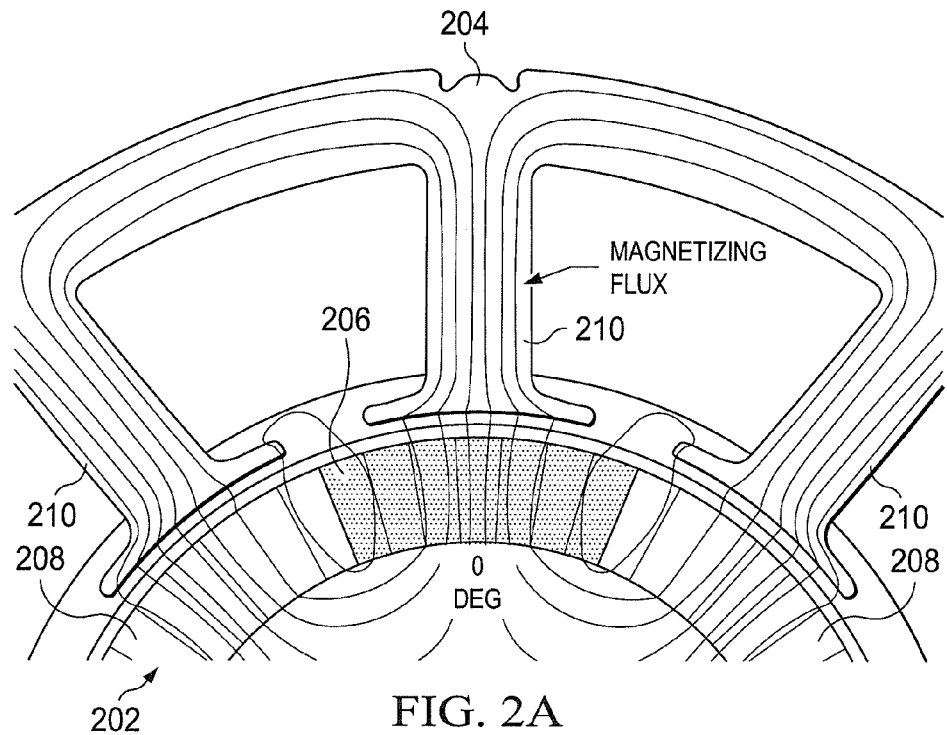
Figure 2B:
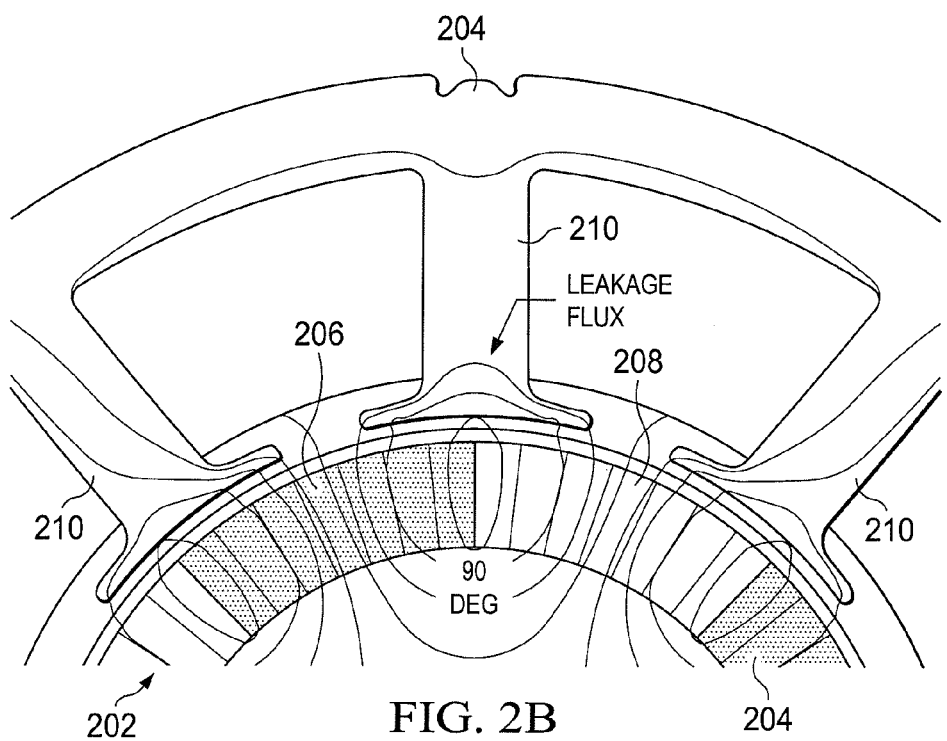

FIGS. 2A and 2B illustrate portions of a rotor 202 and a stator 204 in a permanent magnet motor. As shown here, the rotor 202 includes an outer ring or other area having alternating magnetic poles, such as poles 206-208. For example, the poles 206 could represent magnetic "north" poles, and the poles 208 could represent magnetic "south" poles. These poles 206-208 can be created in the rotor 202 in any suitable manner. For instance, the poles 206-208 could be created using one or more magnetic structures embedded in or connected to the rotor 202. As a particular example, the rotor 202 could include individual magnets, where each magnet forms a single one of the poles 206-208. As another particular example, the rotor 202 could include a ring where individual sections are magnetized in different ways. Any other suitable structure(s) could be used to provide the alternating magnetic poles 206-208. The rotor 202 could be formed from any suitable material(s) and in any suitable manner.

The stator 204 in this example includes multiple teeth 210 that are arranged around the rotor 202 and that project inward from an outer ring towards the rotor 202. Although not shown here, conductive windings are placed around the teeth 210 of the stator 204. These conductive windings are selectively energized and de-energized based on electrical signals, such as those from the inverter 104. This creates a rotating magnetic field that interacts with the magnetic poles 206-208 of the rotor 202, causing the rotor 202 to rotate. Each tooth 210 of the stator 204 can have any suitable size, shape, and dimensions. The stator 204 itself could also be formed from any suitable material(s) and in any suitable manner.

Figure 3A:
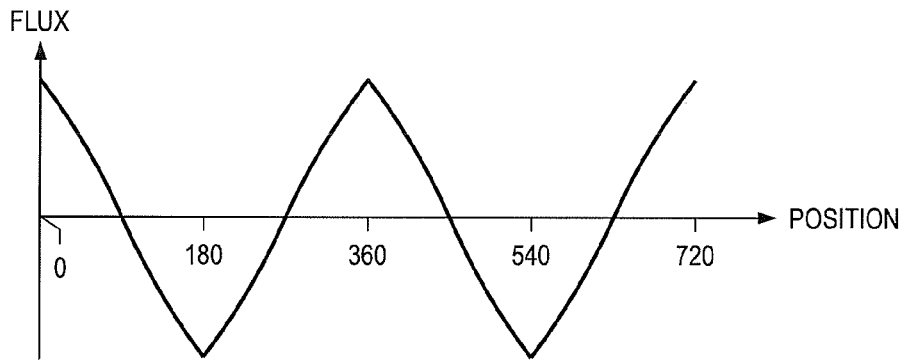
FIGS. 2A through 7B illustrate example design details of a permanent magnet motor in accordance with this disclosure.
Figure 3B:
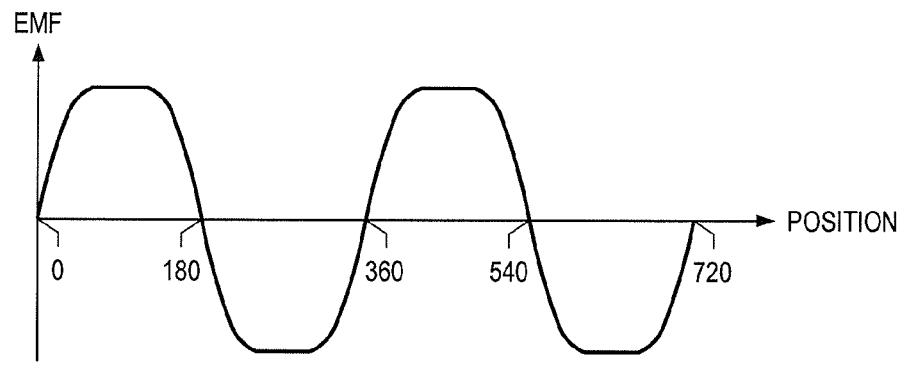

In a motor such as that shown in FIGS. 2A and 2B, the geometric design of the rotor 202 and stator 204 can be used to create a back-EMF waveform that is dependent on the rotor's position and speed. This back-EMF waveform is caused by periodic changes of magnetic fluxes on the rotor 202 (where the magnetic fluxes are induced by the movement of the magnets that create the poles 206-208 in the rotor 202). As shown in FIG. 2A, when the centerline of a stator tooth 210 is aligned with the centerline of a magnetic pole 206 or 208 of the rotor, the tooth 210 in the stator 204 can have the greatest magnetizing flux. As shown in FIG. 2B, when the centerline of the stator tooth 210 is aligned with the inter-polar space between two magnetic poles 206-208 of the rotor, the tooth 210 in the stator 204 can have only a small amount of leakage magnetizing flux. Ideally, the spatial distribution of the magnetic flux is a nearly triangular waveform as shown in FIG. 3A, which would result in a nearly trapezoidal back-EMF waveform as shown in FIG. 3B.

Unfortunately, many conventional sensorless motor controllers perform position and velocity estimation calculations based on the assumption that the back-EMF waveform will be purely sinusoidal. As a result, these approaches may not be effective when used with permanent magnet motors, which typically have back-EMF waveforms that are far from sinusoidal.

This disclosure provides a permanent magnet motor design that utilizes the "flux leakage effect" to provide a better sinusoidal back-EMF waveform. As can be seen in FIG. 2B, some magnetic flux enters or leaks into the stator teeth 210 when the centerlines of the stator teeth 210 are aligned with the inter-polar spaces between the rotor's magnetic poles 206-208. This flux leakage is what leads to a change of magnetizing flux and the shape of the back-EMF waveform. By detecting the back-EMF waveform from current measurements, this type of motor is suitable for sensorless control.

Figure 4A:
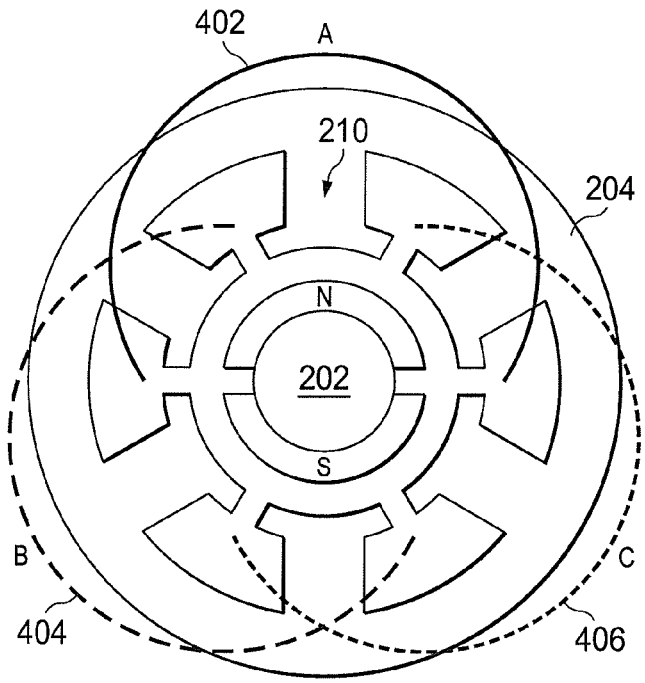

A permanent magnet motor can therefore be designed as follows to provide an improved sinusoidal back-EMF waveform. First, some conventional permanent magnet motors use distributed conductive windings on the teeth 210 of a stator 204 as shown in FIG. 4A. In this example, there are three windings 402-406, and each winding 402-406 is wound around a pair of the stator teeth 210. These conductive windings 402-406 are labeled "A," "B," and "C" to indicate that they are energized using different three-phase voltages from an inverter.

Figure 4B:
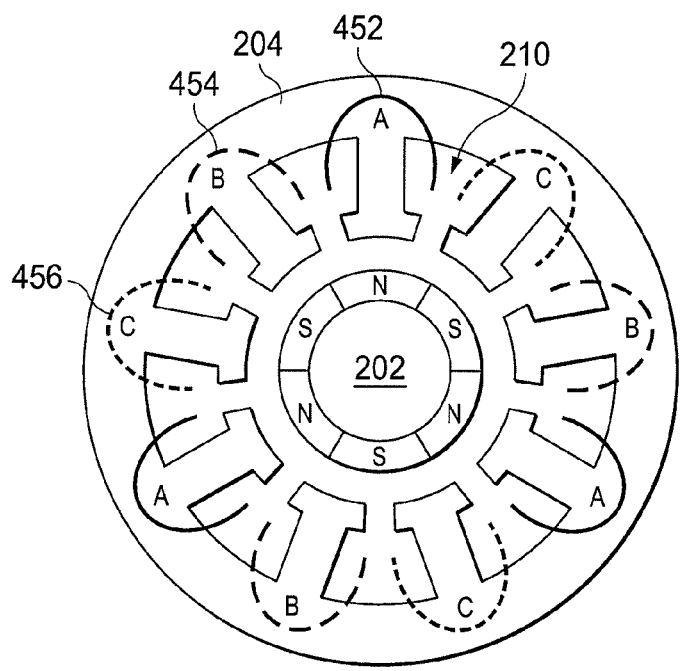

In contrast, FIG. 4B shows concentrated conductive windings (including windings 452-456), where each conductive winding 452-456 is wound around a single stator tooth 210. Again, these conductive windings 452-456 are labeled "A," "B," and "C" to indicate that they are energized using different three-phase voltages from an inverter. The use of concentrated conductive windings (each wound around a single stator tooth) helps to increase the influence of flux leakage shown in FIG. 2B. Thus, an improvement of the sinusoidal shape of the back-EMF waveform generated by the motor is achieved.

Figure 5:
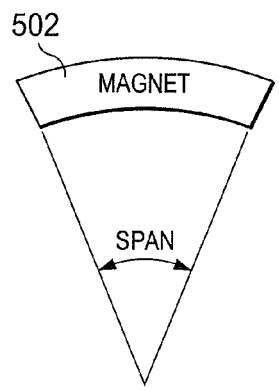

Second, some conventional permanent magnet motors have magnetic poles with large spans on their rotors. In FIG. 4A, for example, there are only two magnetic poles on the rotor 202, each spanning approximately 180°. The span of a magnetic pole is shown in FIG. 5. To help improve the sinusoidal shape of the back-EMF waveform generated by a motor, magnets 502 on a rotor (or the magnetic poles on the rotor) could span a smaller angle. For instance, in some motors, each magnet 502 (or magnetic pole) could span an angle of about 60° or less as illustrated in FIG. 4B. As a result, a rotor could include six or more angularly-spaced magnetic poles, with each magnetic pole having an angular span of about 60° or less.

Figure 6A:
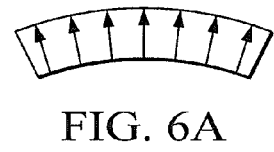
Figure 6B:
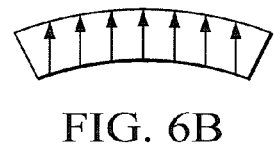

Third, the magnets or magnetic poles used in a rotor could be magnetized radially as shown in FIG. 6A or in parallel as shown in FIG. 6B. Parallel magnetization can result in more flux leakage in a motor, which can lead to an improved sinusoidal back-EMF waveform. Thus, the use of parallel magnetization can be used to provide a more sinusoidal back-EMF waveform.

Figure 7A:
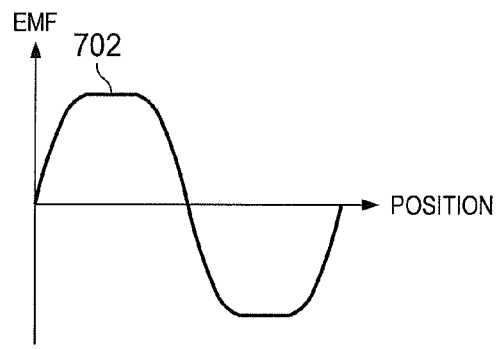
Figure 7B:
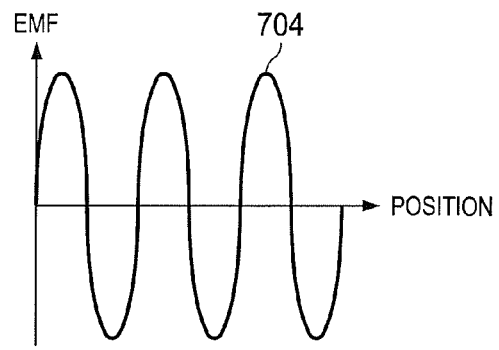

Using one or more of these design approaches can make the back-EMF waveform from a motor significantly more sinusoidal. An example of this is shown in FIGS. 7A and 7B. In particular, FIG. 7A illustrates a back-EMF waveform 702 from a motor designed as shown in FIG. 4A, which includes distributed windings and a 180° magnetic pole span. FIG. 7B illustrates a back-EMF waveform 704 from a motor designed as shown in FIG. 4B, which includes concentrated windings and an approximately 60° magnetic pole span. As can be seen here, the back-EMF waveform 704 has a shape that is significantly more sinusoidal than the back-EMF waveform 702.

Note that a perfect sinusoidal shape is not required in a back-EMF waveform. This is meant merely to show that an improved sinusoidal back-EMF waveform can be obtained using the design approaches described above. This can help lead to more accurate sensorless position and velocity estimation calculations.

Although FIGS. 2A through 7B illustrate examples of design details of a permanent magnet motor, various changes may be made to FIGS. 2A through 7B. For example, a rotor 202 could include any number of magnetic poles 206-208, and a stator 204 could include any number of teeth 210 and any number of concentrated windings 452-456. Moreover, the signals shown here are for illustration only. Other motors having different design parameters may generate different back-EMF waveforms.

Figure 8:
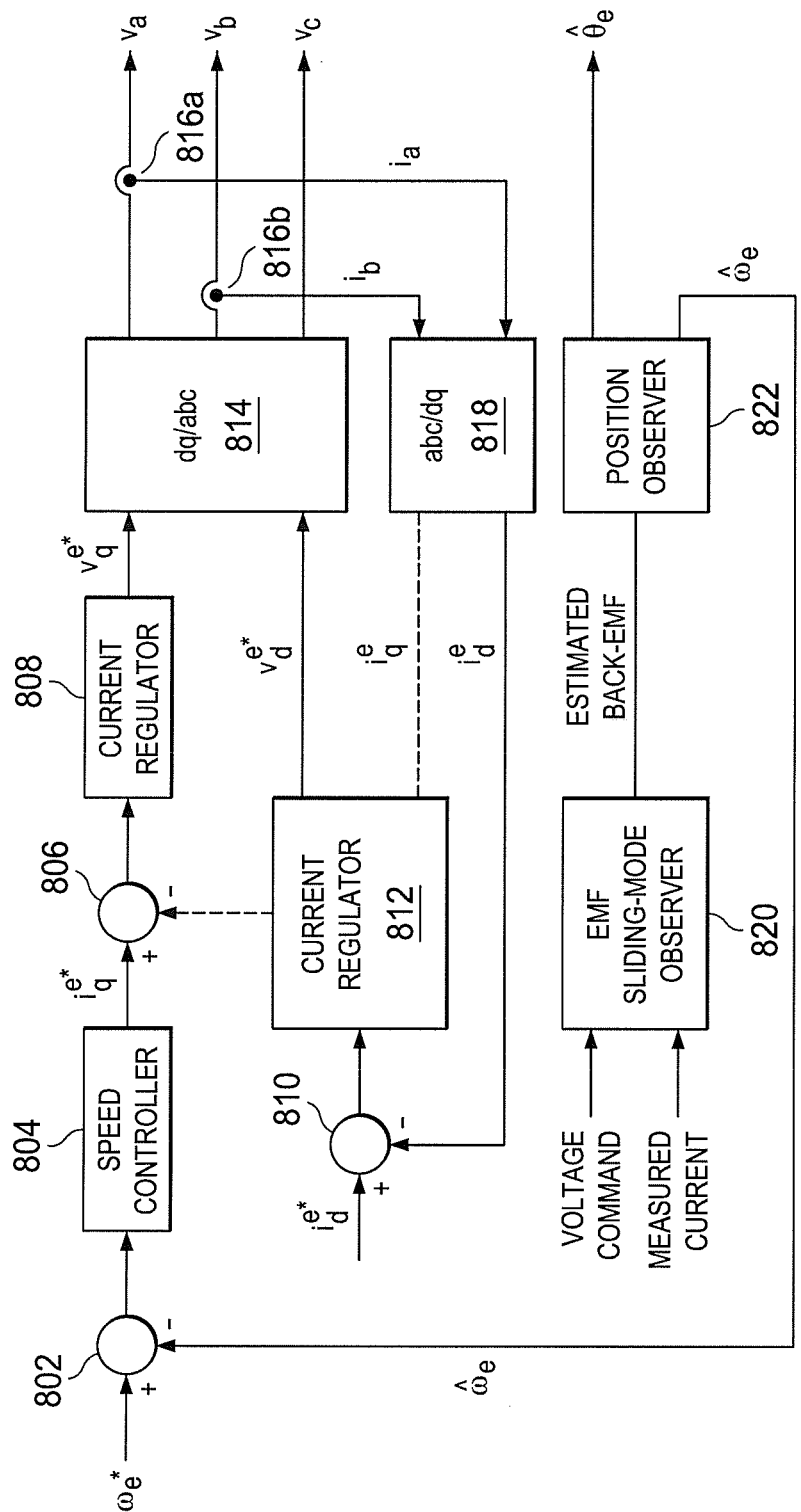
FIGS. 8 through 10 illustrate example design details of a motor controller for a permanent magnet motor in accordance with this disclosure.
Figure 9A:
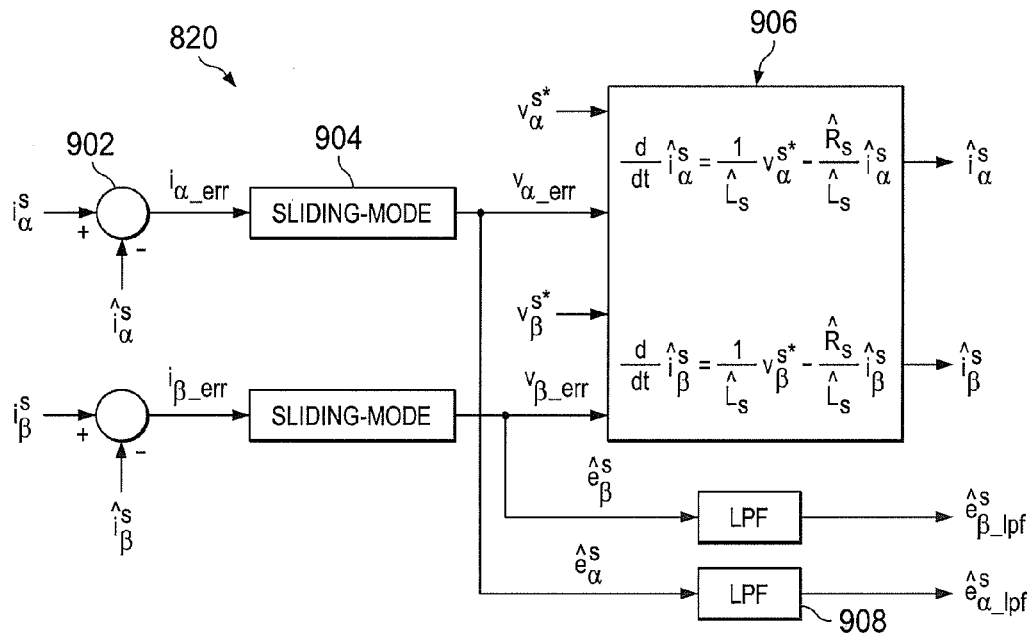
Figure 9B:
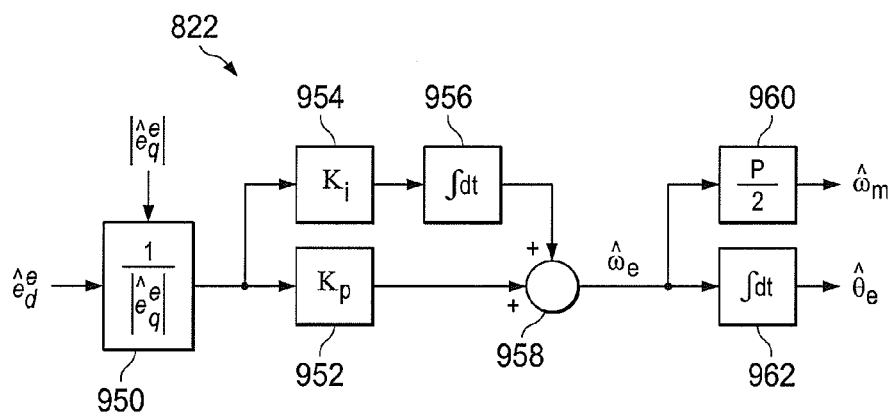
Figure 10:
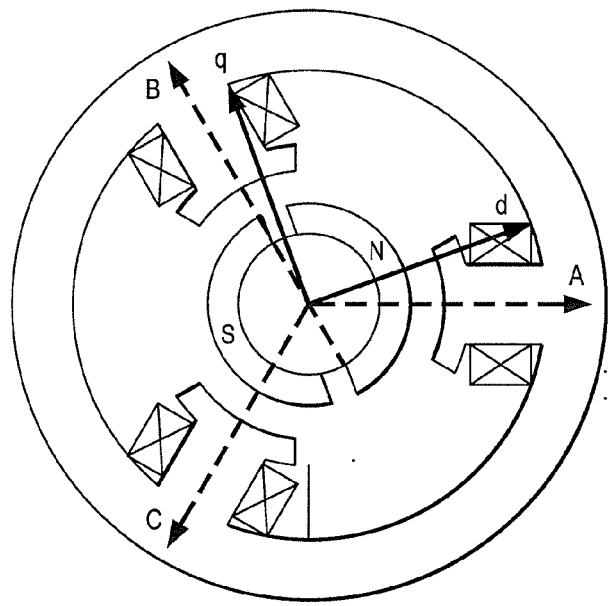

FIGS. 8 through 10 illustrate example design details of a motor controller for a permanent magnet motor in accordance with this disclosure. These design details could be incorporated into the motor controller 108 in the system 100 of FIG. 1. Of course, these design details could be incorporated into other motor controllers operating in other systems.

The motor controller here supports the use of field-oriented control, which generally includes controlling the voltages provided to a motor while representing those voltages with a vector. The motor, as a three-phase time-dependent and speed-dependent system, can be transformed via projection into a two-coordinate time-invariant synchronous system. The two coordinate axes are referred to as the d and q axes as illustrated in FIG. 10. The motor is controlled by generating $i_d^{e*}$ and $i_q^{e*}$ current commands for the d and q axes, respectively. The is current command is used to control the magnetizing flux of the motor, while the current command is used to control the motor torque. These current commands are then converted to $v_d^{e*}$ and $v_q^{e*}$ voltage commands for the d and q axes, respectively. The $v_d^{e*}$ and $v_q^{e*}$ voltage commands define a voltage vector that is used to generate three-phase voltages for the motor.

As shown in FIG. 8, the motor controller includes a combiner 802, which receives the commanded speed signal $\omega_e^*$ and an estimated speed signal $\hat{\omega}_e$. The estimated speed signal $\hat{\omega}_e$ represents feedback identifying an estimate of the motor's actual speed. The combiner 802 outputs a difference between these signals, which identifies the error between the commanded speed signal $\omega_e^*$ and the estimated speed signal $\hat{w}_e$. The combiner 802 includes any suitable structure for combining signals.

A speed controller 804 receives the output of the combiner 802. The speed controller 804 uses the error identified by the combiner 802 to generate the current command $i_q^{e*}$ for the motor. The speed controller 804 includes any suitable structure for converting a speed error into a current command.

Another combiner 806 combines the current command $i_q^{e*}$ with a feedback signal $i_q^e$, which represents a measurement of the actual current in the q axis. The combiner 806 generates an output identifying the difference or error between those signals. The combiner 806 includes any suitable structure for combining signals.

A current regulator 808 receives the output of the combiner 806. The current regulator 808 uses the error identified by the combiner 806 to generate the voltage command $v_q^{e*}$ for the motor. The current regulator 808 includes any suitable structure for converting a current error into a voltage command.

A third combiner 810 combines the current command $i_d^{e*}$ with a feedback signal $i_d^e$, which represents a measurement of the actual current in the d axis. The combiner 810 generates an output identifying the difference or error between those signals. The combiner 810 includes any suitable structure for combining signals.

A current regulator 812 receives the output of the combiner 810. The current regulator 812 uses the error identified by the combiner 810 to generate the voltage command $v_d^{e*}$ for the motor. The current regulator 812 includes any suitable structure for converting a current error into a voltage command.

A dq/abc unit 814 receives the $v_d^{e*}$ and $v_q^{e*}$ voltage commands defining the voltage vector and converts the voltage vector into three-phase voltage signals $v_a$, $v_b$, and $v_c$. These three-phase voltage signals define the voltages to be applied (to the "A," "B," and "C" windings of the stator) during the three phases of the motor 106. Although not shown, the three-phase voltage signals $v_a$, $v_b$, and $v_c$ can be converted into PWM signals for driving the transistor switches in the inverter 104. The dq/abc unit 814 includes any suitable structure for converting a voltage vector into three-phase voltage signals.

Two phase current sensors 816a-816b capture measurements of the currents in two of the three-phase voltage signals. Among other things, the sensors 816a-816b capture information used for back-EMF estimation (which is then used to estimate the rotor position and speed). Each phase current sensor 816a-816b includes any suitable structure for measuring a current.

An abc/dq unit 818 receives the three-phase current measurements from the sensors 816a-816b and converts the measurements back into the d-q domain. In doing this, the abc/dq unit 818 generates the feedback signals $i_q^e$ and $i_d^e$, which represent the measurements of the actual currents in the q and d axes. The abc/dq unit 818 includes any suitable structure for converting current measurements associated with three-phase voltage signals into current measurements associated with d-q axes.

As noted above, sensorless motor control derives one or more characteristics of a motor, such as motor speed or rotor position, rather than measuring those characteristics directly. To support sensorless motor control here, the motor controller includes an EMF sliding-mode observer 820 and a position observer 822. The sliding-mode observer 820 generally operates to estimate the back-EMF waveform of the motor, where both voltage and current information are used to obtain the back-EMF waveform. The sliding-mode observer 820 includes any suitable structure for identifying the back-EMF waveform of a motor. The position observer 822 generally operates to estimate the position of the motor's rotor, and the speed of the motor can then be estimated using the rate of change in the rotor's position. The position observer 822 includes any suitable structure for identifying the position of a rotor.

FIGS. 9A and 9B illustrate example implementations of the sliding-mode observer 820 and the position observer 822, respectively. With respect to FIG. 9A, the use of a sliding-mode observer is beneficial since it can have better dynamic performance to reduce system noise and parameter variation, which makes it suitable for EMF estimation (particularly during low motor speeds). The sliding-mode observer 820 uses both voltage and current information to estimate the EMF waveform.

In some implementations, the dynamic equation of the sliding-mode observer 820 can be expressed as:

$$\frac{d}{dt}\begin{pmatrix}\hat{i}_\alpha^s\\\hat{i}_\beta^s\\\hat{e}_\alpha^s\\\hat{e}_\beta^s\end{pmatrix} = \frac{1}{\hat{L}_s}\begin{pmatrix}v_\alpha^{s*}\\v_\beta^{s*}\\0\\0\end{pmatrix} - \frac{\hat{R}_s}{\hat{L}_s}\begin{pmatrix}\hat{i}_\alpha^s\\\hat{i}_\beta^s\\0\\0\end{pmatrix} - \frac{K_{sm}}{\hat{L}_s}\begin{pmatrix}\text{sign}(i_{\alpha\_err})\\\text{sign}(i_{\beta\_err})\\-\text{sign}\left(\frac{d}{dt}i_{\alpha\_err}\right)\times\hat{L}_s\\-\text{sign}\left(\frac{d}{dt}i_{\beta\_err}\right)\times\hat{L}_s\end{pmatrix} \quad (1)$$

Here and in FIG. 9A, $v_\alpha^{s*}$ and $v_\beta^{s*}$ represent the voltage commands, and $i_\alpha^s$ and $i_\beta^s$ represent the measured currents. Also, $i_{\alpha\_err}$ and $i_{\beta\_err}$ represent current errors calculated by two combiners 902 using the $i_\alpha^s$ and $i_\beta^s$ measurements, and $v_{\alpha\_err}$ and $v_{\beta\_err}$ represent voltage errors calculated by two sliding-mode controllers 904 using outputs of the combiners 902. Further, $\hat{i}_\alpha^s$, $\hat{i}_\beta^s$, $\hat{e}_\alpha^s$, and $\hat{e}_\beta^s$ represent estimated currents and EMF voltages in a motor stator-referred stationary αβ frame. The $\hat{i}_\alpha^s$ and $\hat{i}_\beta^s$ values can be calculated using a computation unit 906, which can perform the calculations shown in FIG. 9A and provide the $\hat{i}_\alpha^s$ and $\hat{i}_\beta^s$ values as feedback to the combiners 902. In addition, the values $\hat{R}_s$ and $\hat{L}_s$ represent the estimated resistance and inductance of the motor, and $K_{sm}$ represents the gain for the sliding-mode controllers 904. Here, $K_{sm}$ determines the estimation bandwidth of the sliding-mode observer 820 (which may be as high as possible).

By manipulating the estimated currents $\hat{i}_\alpha^s$ and $\hat{i}_\beta^s$ to be equal to the measured currents $i_\alpha^s$ and $i_\beta^s$, the EMF voltage can be expressed as:

$$\hat{e}_\alpha^s = K_{sm}\text{sign}(\tilde{i}_\alpha^s) \quad (2)$$

$$\hat{e}_\beta^s = K_{sm}\text{sign}(\tilde{i}_\beta^s) \quad (3)$$

Note that $\hat{e}_\alpha^s$ and $\hat{e}_\beta^s$ are discontinuous waveforms due to the sliding-mode control. As a result, low-pass filters (LPFs) 908 are used in the sliding-mode observer 820 to obtain continuous EMF vectors $\hat{e}_{\alpha\_lpf}^s$ and $\hat{e}_{\beta\_lpf}^s$.

With respect to FIG. 9B, knowledge of the back-EMF waveform can be used to calculate the rotor position of a motor. In conventional sensorless motor control algorithms, the rotor's position is often calculated using an arc-tangent function, and the speed is estimated from the differentiation of rotor's position. This can be expressed as:

$$\theta_e = \arctan\left(\frac{-e_\alpha^s}{e_\beta^s}\right) \quad (4)$$

$$\omega_e = \frac{d\theta_e}{dt} \quad (5)$$

The back-EMF waveform is dependent on the motor speed. However, at very low speeds, the arc-tangent calculation causes problems when the denominator in Equation (4) is near zero. This degrades conventional EMF-based sensorless drive performance because the back-EMF waveform is proportional to the motor speed.

To improve the low speed performance, an observer-based estimation method can be used in place of the arc-tangent calculation in the position observer 822. The position observer 822 in FIG. 9B receives $|\hat{e}_q^e|$ and $\hat{e}_d^e$ signals, which can be defined as:

$$|\hat{e}_q^e| = \sqrt{\hat{e}_{\alpha\_lpf}^{s\,2} + \hat{e}_{\beta\_lpf}^{s\,2}} = \omega_e \lambda_{pm} \quad (6)$$

$$\hat{e}_d^e \approx \omega_e \lambda_{pm} \theta_{err} \quad (7)$$

These values represent the estimated EMF voltages in the motor rotor-referred synchronous frame. The position of the motor can then be estimated based on the position error from the back-EMF voltage in the estimated dq reference frame as follows:

$$\begin{bmatrix}\hat{e}_d'\\\hat{e}_q'\end{bmatrix} = \begin{bmatrix}\cos\hat{\theta}_e & \sin\hat{\theta}_e\\-\sin\hat{\theta}_e & \cos\hat{\theta}_e\end{bmatrix}\begin{bmatrix}\hat{e}_{\alpha\_lpf}^s\\\hat{e}_{\beta\_lpf}^s\end{bmatrix} \quad (8)$$

$$= \begin{bmatrix}\cos\hat{\theta}_e & \sin\hat{\theta}_e\\-\sin\hat{\theta}_e & \cos\hat{\theta}_e\end{bmatrix}\begin{bmatrix}-\omega_e\lambda_{pm}\sin\theta_e\\\omega_e\lambda_{pm}\cos\theta_e\end{bmatrix}$$

$$= \begin{bmatrix}-\omega_e\lambda_{pm}\sin\theta_{err}\\\omega_e\lambda_{pm}\cos\theta_{err}\end{bmatrix}(\theta_{err} = \theta_e - \hat{\theta}_e)$$

It can be observed that these back-EMF waveforms contain spatial information.

To implement this functionality, the position observer 822 in FIG. 9B includes a division unit 952, which scales the $\hat{e}_d^e$ signal using the $|\hat{e}_q^e|$ signal. The position observer 822 also implements a proportional-integral (PI) regulator using a proportional controller 952 and an integral controller 954-956. A combiner 958 combines the outputs of the proportional controller 952 and the integral controller 954-956. The output of the combiner 958 is provided to a scaling unit 960 and an integrator 962, which generate the estimated velocity $\hat{\omega}_m$ and the estimated position $\hat{\theta}_e$ of the rotor.

Due to the use of a PI regulator, the position observer 822 has a low-pass filter property. As a result, high frequency noise (especially at low speeds) is reduced during the estimation. In FIG. 9B, $K_p$ and $K_i$ represent the proportional and integral controller gains for the position observer 822, and P represents the pole pairs of the motor.

The components shown in FIGS. 9A and 9B could be implemented using any suitable structure(s). For example, each of the components 902-908, 950-962 could be implemented using hardware modules. In other systems, various input signals could be digitized, and the components 902-908, 950-962 could be implemented using software or firmware instructions executed on a hardware platform. A combination of these approaches could also be used, where some of the components 902-908, 950-962 are implemented using only hardware and others of the components 902-908, 950-962 are implemented using software/firmware executed by hardware.

Although FIGS. 8 through 9B illustrate examples of design details of a motor controller for a permanent magnet motor, various changes may be made to FIGS. 8 through 9B. For example, various components in FIGS. 8 through 9B could be combined or further subdivided.

Using the designs above for the motor 106 and the motor controller 108, significant improvement can be obtained in the control of the permanent magnet motor 106, particularly at low speeds. According to experimental results with particular implementations of the motor 106 and the motor controller 108, a 2% rated speed under full-load operation can be achieved in a permanent magnet motor that provides a substantially sinusoidal back-EMF waveform. Note, however, that the design of the motor described above could be used without the design of the motor controller described above (and vice versa).

Figure 11:
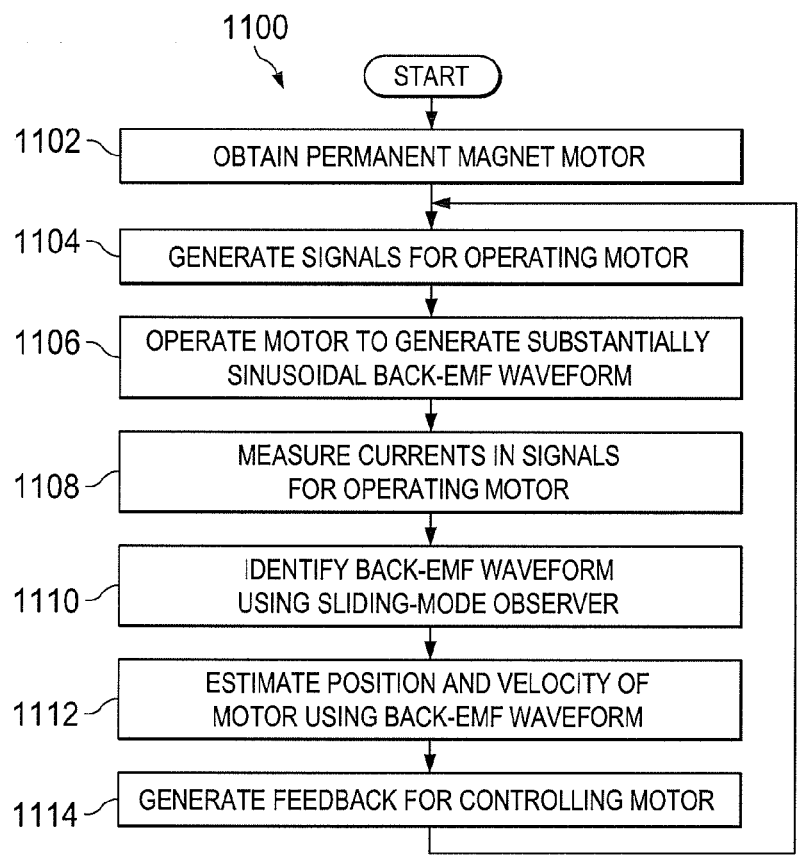
FIG. 11 illustrates an example method for sensorless control of a permanent magnet motor in accordance with this disclosure.

FIG. 11 illustrates an example method 1100 for sensorless control of a permanent magnet motor in accordance with this disclosure. As shown in FIG. 11, a permanent magnet motor is obtained at step 1102. The permanent magnet motor can have the design as described above, including a stator with multiple teeth and concentrated conductive windings and a rotor with magnetic poles each spanning about 60° or less with parallel magnetization. Signals for operating the motor are generated at step 1104. This could include, for example, the motor controller 108 generating three-phase signals for controlling the inverter 104, which provides electrical signals to the conductive windings of the motor 106. Because of the design of the motor 106, the motor 106 generates a substantially sinusoidal back-EMF waveform during its operation at step 1106.

During the operation of the permanent magnet motor, currents in the signals for operating the motor are measured at step 1108. This could include, for example, using the phase current sensors 816a-816b to measure the currents in two of the three-phase signals. The back-EMF waveform of the motor is identified using a sliding-mode observer at step 1110. This could include, for example, the sliding-mode observer 820 receiving the measured currents and voltage commands generated during operation of the motor 106. This could also include the sliding-mode observer 820 generating continuous EMF vectors using those inputs. The position and velocity of the motor are estimated using the identified back-EMF waveform at step 1112. This could include, for example, the position observer 822 identifying the estimated position and velocity of the rotor in the motor 106 using the continuous EMF vectors from the sliding-mode observer 820. Feedback is generated for controlling the motor at step 1114. This could include, for example, the motor controller 108 generating speed and current errors using the estimated velocity and the measured currents. The speed and current errors can be used to modify the signals for operating the motor.

Although FIG. 11 illustrates one example of a method 1100 for sensorless control of a permanent magnet motor, various changes may be made to FIG. 11. For example, while shown as a series of steps, various steps in FIG. 11 could overlap, occur in parallel, occur in a different order, or occur any number of times. As a particular example, steps for controlling the motor occur during operation of the motor and the generation of the substantially sinusoidal back-EMF waveform.

While this disclosure has described certain examples and generally associated methods, alterations and permutations of these examples and methods will be apparent to those skilled in the art. Accordingly, the above description of the examples does not define or constrain this disclosure. Other changes, substitutions, and alterations are also possible without departing from the spirit and scope of this disclosure, as defined by the following claims.

What is claimed is:

1. A system comprising:
   an inverter configured to generate a current;
   a permanent magnet motor coupled with the inverter, the permanent magnet motor configured to generate a back-electromagnetic force (EMF) waveform that is substantially sinusoidal in response to receiving the current from the inverter; and
   a motor controller including:
      a sliding-mode observer circuitry having:
         a combiner coupled with the permanent magnet motor, and configured to determine a current error based on an estimated current and the current received by the permanent magnet motor; and
         a sliding-mode controller coupled with the combiner, and configured to estimate the back-EMF waveform based on the current error; and
      a position observer circuitry configured to estimate a characteristic of the permanent magnet motor using the estimated back-EMF waveform, and the position observer circuitry including:
         a first integrator coupled with the sliding-mode observer, and configured to generate an integral output based on an integral controller gain and a continuous EMF vector; and
         a second integrator coupled with the first integrator, and configured to generate an estimated position by integrating the integral output.

2. The system of claim 1, in which:
   the permanent magnet motor includes a rotor and a stator encircling the rotor; and
   the stator include teeth projecting towards the rotor, and conductive windings, each wound around only one of the teeth.

3. The system of claim 2, in which the rotor of the permanent magnet motor includes magnetic poles, each of the magnetic poles having a span of about 60° or less.

4. The system of claim 3, in which the rotor includes magnets that form the magnetic poles, each of the magnets having a parallel magnetization.

5. The system of claim 1, in which the sliding-mode observer circuitry includes a computation unit coupled with the sliding-mode controller, and configured to generate the estimated current based on a voltage command and the estimated back-EMF waveform.

6. The system of claim 1, in which:
the estimated back-EMF waveform is discontinuous; and
the sliding-mode observer circuitry is configured to generate the continuous EMF vector by filtering the discontinuous EMF waveform.

7. The system of claim 6, in which the position observer circuitry includes a proportional-integral (PI) regulator configured to generate an estimated velocity and an estimated position of the rotor based on the continuous EMF vector.

8. The system of claim 7, in which the position observer circuitry includes a scaling unit configured to generating the estimated velocity based on the continuous EMF vector and pole pairs of the permanent magnet motor.

9. An apparatus comprising:
a motor controller configured to generate signals for controlling operation of a permanent magnet motor, the motor controller including:
a sliding-mode observer circuitry coupled with the permanent magnet motor, and configured to detect a current driving the permanent magnet motor, the sliding-model observer including:
a combiner configured to determine a current error based on the detected current and an estimated current; and
a sliding-mode controller coupled with the combiner, and configured to estimate a back-EMF waveform based on the current error; and
a position observer circuitry coupled with the sliding-mode observer, and configured to estimate a characteristic of the permanent magnet motor using the estimated back-EMF waveform, and
the position observer circuitry including:
a first integrator coupled with the sliding-mode observer, and configured to Generate an integral output based on an integral controller gain and a continuous EMF vector; and
a second integrator coupled with the first integrator, and configured to generate an estimated position by integrating the integral output.

10. The apparatus of claim 9, in which the sliding-mode observer circuitry includes a computation unit coupled with the sliding-mode controller, and configured to generate the estimated current based on a voltage command and the estimated back-EMF waveform.

11. The apparatus of claim 10, in which:
the estimated back-EMF waveform is discontinuous; and
the sliding-mode observer circuitry is configured to generate the continuous EMF vector by filtering the discontinuous EMF waveform.

12. The apparatus of claim 11, in which the position observer circuitry includes a scaling unit configured to generating an estimated velocity based on the continuous EMF vector and pole pairs of the permanent magnet motor.

13. The apparatus of claim 9, in which the characteristic of the permanent magnet motor includes an estimated velocity and an estimated position of the rotor in the permanent magnet motor.

* * * * *